United States Patent [19]
Bourdeau

[11] 3,787,236
[45] Jan. 22, 1974

[54] TUNGSTEN COATED GLASS FIBER
[75] Inventor: Romeo G. Bourdeau, Wapping, Conn.
[73] Assignee: United Aircraft Corporation, East Hartford, Conn.
[22] Filed: Nov. 11, 1971
[21] Appl. No.: 197,913

Related U.S. Application Data
[63] Continuation-in-part of Ser. No. 864,839, Oct. 8, 1969, abandoned.

[52] U.S. Cl............ 117/227, 117/107.1, 117/107.2, 117/126 GM, 117/229
[51] Int. Cl.............................................. B44a 1/02
[58] Field of Search 117/107.1, 106, 126, 217, 227, 117/107, 107.2 R, 123 B, 126 GM, 201; 106/54; 161/175

[56] References Cited
UNITED STATES PATENTS
3,083,550 4/1963 Auerbach............... 117/126 GM
3,215,555 11/1965 Krey............................ 117/123 B
3,669,724 6/1972 Brand............................ 117/107.2
3,543,386 12/1970 Inoue et al..................... 117/107.2
2,812,272 11/1957 Nack et al. .................... 117/107.1
3,506,464 4/1970 Baak et al........................... 106/54

Primary Examiner—Alfred L. Leavitt
Assistant Examiner—J. Massie
Attorney, Agent, or Firm—John D. Del Ponti

[57] ABSTRACT

A composite fiber adapted for usage as a resistively heated substrate in a continuous boron deposition process is described. The fiber has a glass filamentary core provided with a uniform continuous coating of tungsten, the glass core having a coefficient of thermal expansion of 3.5 to 5.0 × $10^{-6}$ in./in./° C so as to match that of the tungsten.

1 Claim, 1 Drawing Figure

PATENTED JAN 22 1974 3,787,236
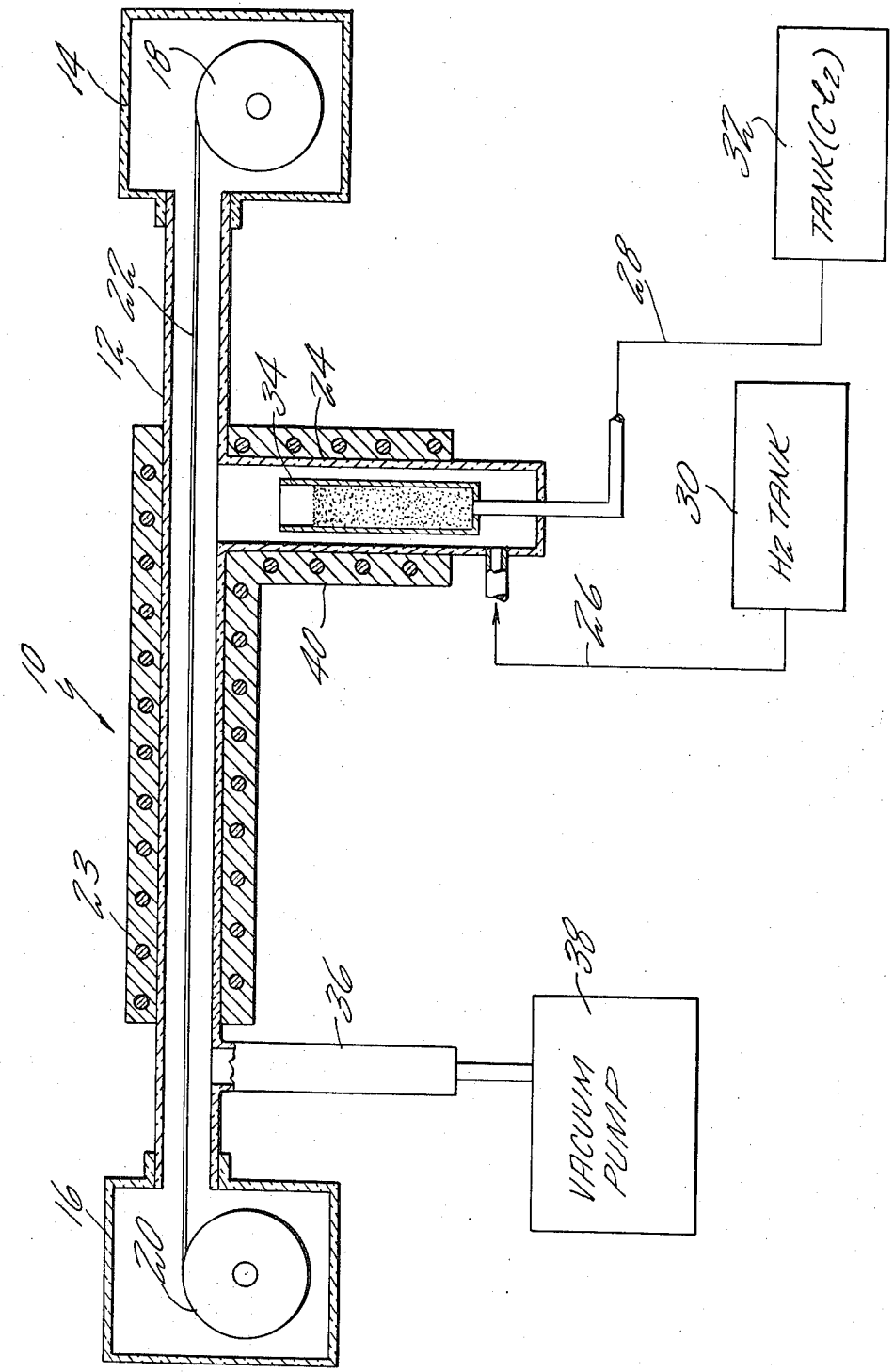

TUNGSTEN COATED GLASS FIBER

BACKGROUND OF THE INVENTION

This is a continuation-in-part of copending application Ser. No. 864,839 filed Oct. 8, 1969 now abandoned, entitled "Method for Producing a Tungsten Coating on a Glass Fiber Substrate."

This invention relates generally to tungsten-surfaced filaments and more particularly relates to both a method for continuously depositing a uniform coating of tungsten on a filamentary glass substrate and the produce made thereby.

It is known that filamentary boron may be produced by a process wherein boron is chemically deposited on a resistively heated tungsten substrate which is drawn through a gaseous reactant stream consisting of boron trichloride admixed with hydrogen. The boron fibers thus produced have been recognized as being admirably adapted for usage in fiber-reinforced structural composites, particularly in aerospace applications. Unfortunately, actual usage of boron fiber has been somewhat limited; primarily because of the prohibitive costs of production of such fibers in processes which use the expensive tungsten as a substrate for the boron.

Because of tungsten's desirable electrical characteristics, compatibility with boron and overall ability to consistently produce quality boron fiber in conventional boron deposition processes, satisfactory replacement filamentary substrates presenting increased cost-effectiveness while consistently yielding properties comparable to present-day boron-tungsten fiber, have met with limited success.

SUMMARY OF THE INVENTION

The present invention relates to the production of filamentary material suitable for use as a substrate in those boron deposition processes such as those shown in U. S. Pat. No. 3,409,469, 3,549,424 and 3,574,649 wherein the substrate is resistively heated. In particular, the invention contemplates a process wherein a uniform coating of tungsten is continuously deposited on a glass filament of selected characteristics. The use of glass filament as a substrate is found to be highly advantageous since it presents a microscopically smooth surface, a circular cross section and can be drawn at extremely high rates.

In a preferred embodiment, a glass filament having a coefficient of thermal expansion of 3.5 to $5.0 \times 10^{-6}$ in./in./°C is passed through a reactor heated to 900°–1,200° C and containing a reactant atmosphere until the desired depth of deposit of tungsten is obtained. The reactant atmosphere is preferably established of a tungsten halide admixed with hydrogen, the tungsten hexachloride and hydrogen being in a volume ratio range of from ⅓ to 1/15 and at a pressure of from 1 to 20 mm Hg.

BRIEF DESCRIPTION OF THE DRAWING

In the detailed description which follows, it will be convenient to make reference to the drawing which shows, in a cross-sectional elevation, a reactor apparatus suitable for use in the practice of the invention.

DESCRIPTION OF THE PREFERRED EMBODIMENTS

Referring to the drawing, a horizontal reactor 10 may be seen to comprise an elongated reactor tube 12, preferably of quartz, having enlarged enclosures 14 and 16 at opposite ends. Suitably received within the enclosures 14 and 16, respectively, are a supply spool 18 and a take-up spool 20, aligned to axially pass a glass filament 22 through the reactor tube 12. The filament is heatable by suitable heating means such as a resistance sound heater coil 23.

A reactant gas inlet tube 24, located adjacent the wire inlet end of the reactor, is connected by separate lines 26 and 28 to a hydrogen source 30 and a chlorine source 32. The lines 26 and 28 are each provided with a flow meter for control purposes. As seen in the drawing, the line 28 provides chlorine gas upwardly through the bottom of a nickel crucible 34 filled with tungsten powder and platinum catalyst located in the inlet tube 24. The crucible is of reduced diameter in comparison to the inlet tube 24 to allow flow of the hydrogen gas past adjacent walls thereof. It will be appreciated that tungsten hexachloride is thus continuously produced in a controlled manner by a direct chlorination of the tungsten powder. It has been found that the present process is successful in producing satisfactory filaments when the reaction chamber is provided with tungsten hexachloride and hydrogen in a volume ratio range of ⅓ to 1/15 with the most preferable ratio being 1/10.

In order to promote the production of the tungsten hexachloride, the inlet tube is heated to a temperature of from 400°–550° C by suitable heating means such as resistance coil 40.

An outlet tube 36 is located adjacent the wire outlet end of the reactor. The outlet tube 36 is connected to a vacuum pump 38 for exhaust purposes as well as for maintaining the desired subatmospheric pressure in the reactor. In the present process, reduced pressure has been found necessary and the preferred pressure range is 1 to 20 mm of mercury.

Satisfactory coatings of tungsten on glass by deposition from tungsten hexachloride-hydrogen can be made by maintaining the temperature of the reaction tube at 900°–1,200° C and preferably at 1,000° C. Generally speaking, it is desirable to limit the residence time of the glass filament in the reactor from 2 to 45 seconds, and preferably from 4 to 6 seconds. In this way, a uniform coating of suitable thickness is deposited without the glass substrate reaching its softening temperature. Experiments were made with filament speeds up to 2,000 feet/hour. The optimum electrical resistance of the tungsten coated glass will depend on its specific application, however, and the formation of a tungsten coating with an electrical resistance in the range from 100 to 200,000 ohms has been found suitable for most applications.

Suitable glass substrates 22 may be generally classified as the $SiO_2$, aluminum silicate and borosilicate glasses having a coefficient of thermal expansion of 3.5 to $5 \times 10^{-6}$ in./in./°C and a softening point between 800°–920° C. It is important to note that the coefficient of thermal expansion of the filamentary glass substrate is critical and must substantially match that of the tungsten coating ($4.3 \times 10^{-6}$ in./in./°C). If outside the range specified, when subjected to heating such as the resistive heating of the boron deposition process, the glass-tungsten composite will be destroyed. If the glass has a coefficient of thermal expansion below $3.5 \times 10^{-6}$, the thermal mismatch causes the tungsten to crack. If above the $5.0 \times 10^{-6}$ upper limit, the mismatch results in spalling off of the tungsten.

Examples of commercially available glasses which are suitable include the Corning Glass Works No. 1720 series, such as No. 1716, G. E. Glass Designation Nos. 175 and 177 and Owens Corning E-glass, D-glass and M-glass. Experiments were run using glasses having diameters from 0.8 – 1.0 mil. The formation of tungsten coated glass for usage as a substrate in the production of boron or silicon carbide filaments results in an end product of reduced density. For example, a 1 mil tungsten coated glass substrate reduces the density of a 4 mil boron filament conventionally produced on 0.5 mil tungsten fiber from 2.7 to 2.4 gms/cc and it reduces the density of a 2.2 mil boron filament (containing 80 volume percent boron) from 3.2 to 2.45 gms/cc. In like manner, a 4 mil SiC filament has a density reduced from 3.5 to 3.3 gms/cc while a 2.2 mil fiber is reduced from 4.04 to 3.1 gms/cc. Besides the advantageous reduction in density, the present process is calculated to be one-tenth the cost per unit length.

EXAMPLE I

Using an 18 inch reactor of the type above-described, a 1 mil Corning Glass Works No. 1716 glass fiber was drawn through the reaction chamber at a speed of 500 feet/hour. The chamber was maintained at a temperature of 1,000° C and a pressure of 1 mm Hg. Tungsten powder in the nickel crucible was heated to 500° C with $H_2$ supplied at 0.25 liters/minute and $Cl_2$ supplied at 0.025 liters/minute. The resulting tungsten coating was continuous and uniform and resulted in a fiber electric resistance of 400 ohms/inch.

EXAMPLES II and III

The apparatus and process parameters of Example I are used, respectively, on filamentary G. E. Glass Nos. 175 and 177 to provide a continuous and uniform coating of tungsten thereon.

EXAMPLES IV – VI

The apparatus and process parameters of Example I are used on respectively E-, D- and M-type filaments (commercially available from Owens Corning) to provide a continuous and uniform coating of tungsten thereon.

What has been set forth above is intended primarily as exemplary to enable those skilled in the art in the practice of the invention and it should be therefore understood that, within the scope of the appended claims, the invention may be practiced in other ways than as specifically described.

What is claimed is:

1. A composite fiber adapted for usage as a resistively heated substrate in a continuous boron deposition process comprising a glass filamentary core having a coefficient of thermal expansion within the range of 3.5 to $5.0 \times 10^{-6}$ in./in./°C and a uniform continuous coating of tungsten on said glass filamentary core, said coating being sufficiently thick to establish an electrical resistance in the composite fiber of 100 to 200,000 ohms.

* * * * *